June 25, 1968 — R. W. CABE — 3,390,260
SUPPORT DEVICE FOR TUBULAR LIGHT GRID ASSEMBLY
Filed Feb. 18, 1966 — 2 Sheets-Sheet 1
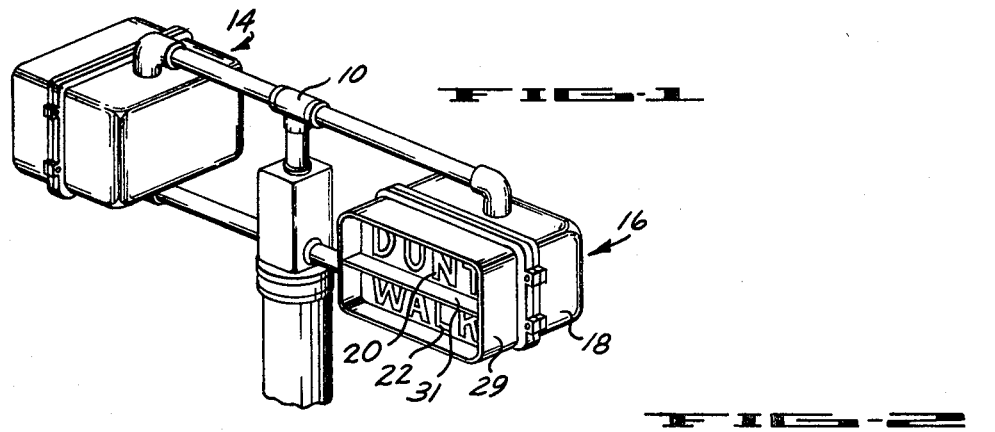
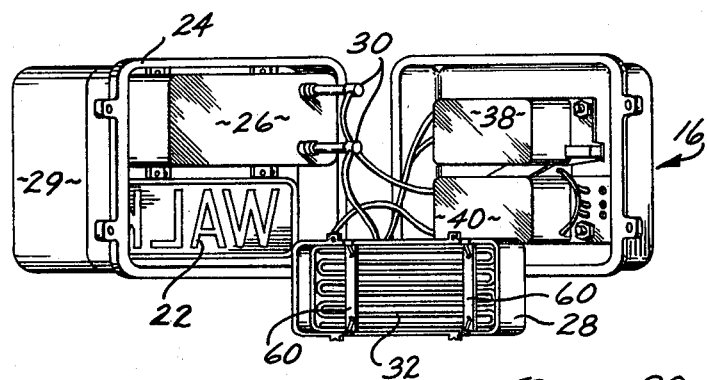
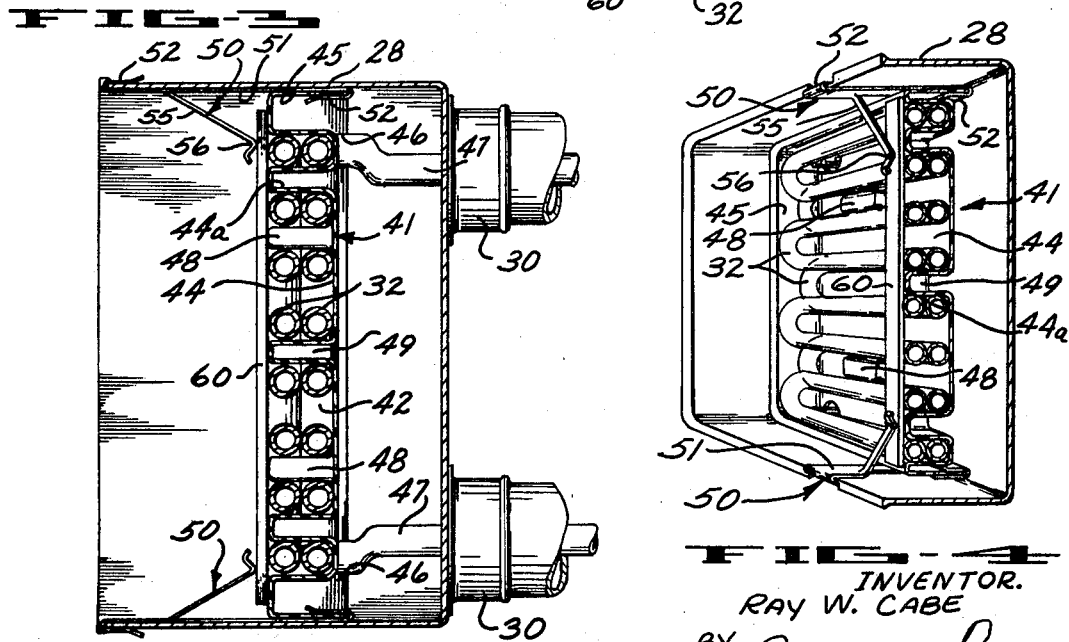
INVENTOR.
RAY W. CABE
BY
Edward A. Sokolski
ATTORNEY

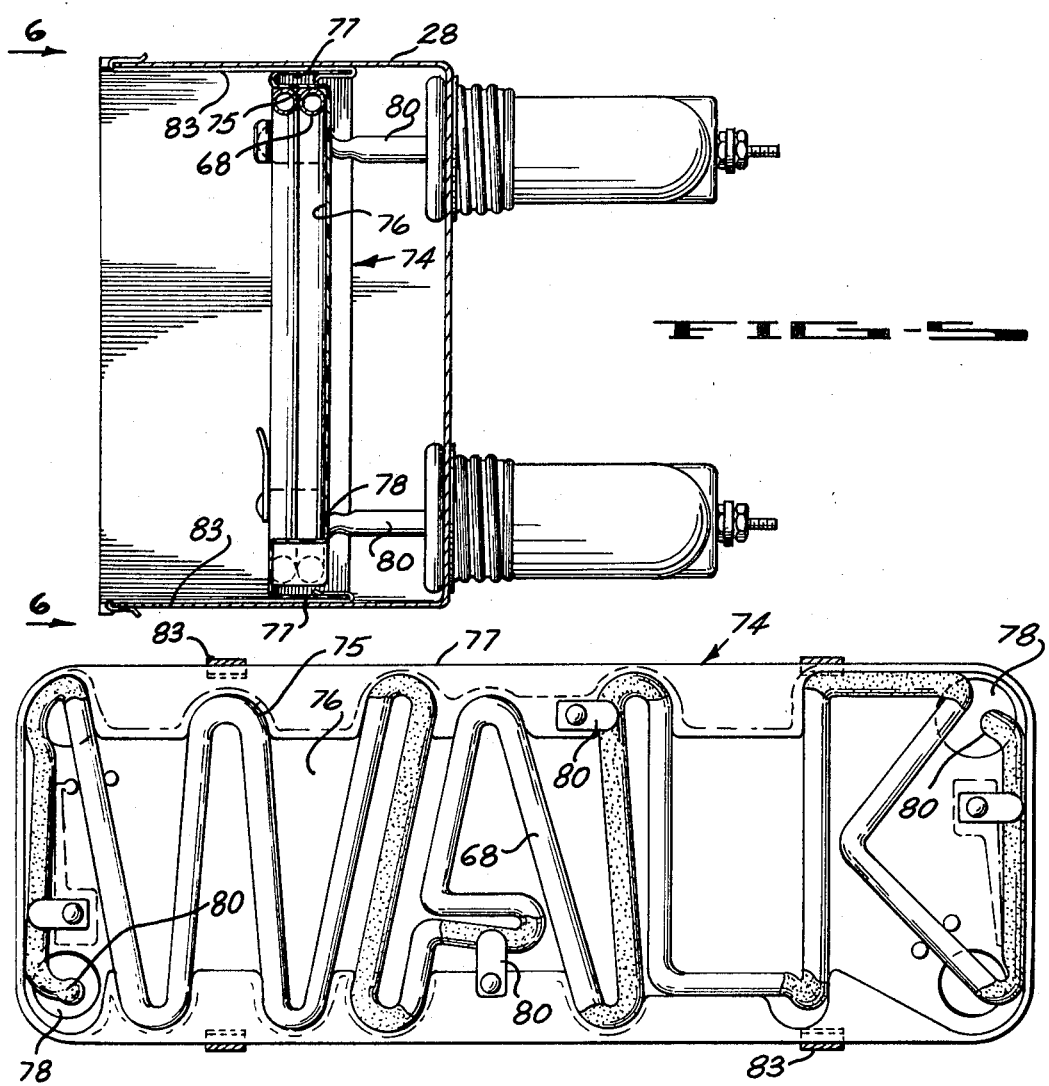

United States Patent Office

3,390,260
Patented June 25, 1968

3,390,260
SUPPORT DEVICE FOR TUBULAR LIGHT
GRID ASSEMBLY
Ray W. Cabe, Manhattan Beach, Calif., assignor to Tamar Electronics Industries, Inc., Los Angeles, Calif., a corporation of Delaware
Filed Feb. 18, 1966, Ser. No. 528,627
9 Claims. (Cl. 240—11.4)

ABSTRACT OF THE DISCLOSURE

A shock resistant support for tubular lights takes the form of a generally rectangular shallow shell of resilient dielectric material in which the edge or marginal material is formed into a double wall surrounding a nest-like cavity contoured around the tubular lights supported therein. Fastening clips are provided to securely retain the lights within the support and to fasten the support to a housing within which it is contained.

---

The present invention relates to a support device for a tubular light grid assembly and more particularly to a device for packaging and supporting tubular lights of the general character disclosed in U.S. Patent No. 3,101,177 issued Aug. 20, 1963, for a Tubular Light Grid Assembly.

The above patent discloses a grid type pedestrian traffic signal having a housing displaying two opaque glass or plastic plates or panes, having letters defined therein by transparent areas forming words. The panes are illuminated from behind by respective luminous gaseous discharge tubings, each bent in the form of a grid and supported in spaced relation behind the panes. When one or more of the grids are energized, one or both panes are illuminated to produce appropriate messages such as "WALK" or "DON'T WALK", for example, for the control of pedestrian traffic.

In another type of such a device, continuous lengths of gaseous discharge tubing are bent and contoured to form complete words or messages.

As pointed out in the aforementioned patent, owing to the fragile nature of tubular lights, an excessive amount of breakage and damage has been experienced in the handling, shipping, and installation of the tubular light assemblies.

It is therefore an object of the present invention to provide a shock-resistant package and support in which to nest tubular lights and a method for fabricating the same.

It is another object of the present invention to provide a shock-resistant package and support for tubular lights that is of simple construction and economical to manufacture.

It is still another object of the present invention to provide a functional tubular light package and support so formed and constructed that relative movement between the tubes and support due to shock and vibration is substantially eliminated.

It is a further object of this invention to provide a dual purpose support for tubular lights that functions as a protective package prior to installation in a fixture as well as a shock-resistant mount and support in the fixture after installation.

It is a still further object of the present invention to provide a shock-resistant mount and support for tubular lights that is quickly and easily installed in a lighting fixture housing with a minimum of components.

Briefly, the shock-resistant support of the present invention, in one preferred embodiment thereof, takes the form of a generally rectangular shallow shell of resilient dielectric material in which the edge or marginal material is formed into a double wall surrounding a nest-like cavity contoured around the outline of the tubular lights supported therein, and fastening means securely retaining the tubular lights in the support while fastening the support within a housing. The support may also be used to package the lights for storage and shipping prior to installation.

The foregoing along with other objects and advantages inherent in the present invention will be more clearly understood with reference to the ensuing specification and appended drawings in which:

FIGS. 1 and 2 are perspective views illustrating a typical installation of a first embodiment of the device of the invention, FIG. 3 is an elevation cross sectional view of the first embodiment of the device of the invention, FIG. 4 is a perspective view partially in cross section illustrating the first embodiment of the device of the invention, FIG. 5 is an end elevation cross sectional view of a second embodiment of the device of the invention, and FIG. 6 is a view as taken along the plane indicated by 6—6 in FIG. 5.

A complete two-way grid type pedestrian signal is shown in FIG. 1. Framework 10 is mounted on top of a post and supports two one-way grid type signals 14 and 16. The signal 14 is mounted in the framework 10 to face a direction which is at right angles to the direction that the signal 16 is facing, as illustrated. Such pedestrian signals are now quite commonplace and well-known in the art.

Each signal is confined within a weather-proof housing 18, and produces alternately illuminated messages "DON'T WALK" in red, or "WALK" in green.

The messages are flashed by illuminating with neon and fluorescent mercury gas tubings the opaque glass panes 20 and 22, which have clear or translucent areas therein in the shape of letters.

As shown in FIG. 2, all components of each signal are readily and easily accessible from the front by opening the housing door. The signal 16 is shown with door 24 swung open on hinges mounted on the left side of the door. The door mounts upper and lower glass panes 20 and 22 (see FIG. 1) fastened in the housing door 24 by clips or other suitable securing means. Two tubing housings 26 and 28, each provided with tubular lights therein, are respectively attached to the housing door 24 by screws, for example, with their open faces exposed to glass panes 20 and 22. A visor 29 having a central horizontal baffle 31 is secured to the housing door 24.

The tubing housings 26 and 28 are preferably one piece castings which enclose the luminous gas tubing bent in the form of grids. Each grid consists of several parallel, equally spaced elements formed from single continuous clear or fluorescent glass tubing having the terminal ends thereof bent outwardly at right angles and capped with conventional electrodes 30. The tubing housing 26 is provided with two capped electrodes 30 seated in respective ends of the tubing forming grids. Tubing housing 28, has four capped electrodes 30 (not visible in FIG. 2) located at the corners thereof, each end pair of electrodes being respectively connected and sealed in the angularly bent ends of an associated grid 32. The electrodes 30 of the various grids are connected by suitable leads to high voltage transformers 38 and 40 to illuminate the gas tubings in the conventional manner.

Tubing housing 26 is provided with a clear glass tubing charged with neon gas and formed into a grid which illuminates the "DON'T" glass pane 20 with red light when energized. Tubing housing 28 is provided with a clear glass tubing charged with neon gas to produce red light, and formed into a grid, and a fluorescent glass tubing charged mainly with mercury to produce green light, being formed into a second grid. Thus it will be seen that an appropriate one of grids 32 may be energized to illuminate the "WALK" glass pane 22 simultaneously with energization of the grid behind the "DON'T" pane 20 so that the message "DON'T WALK" is flashed in red. At other times in response to the traffic controller the fluorescent mercury glass tubing is caused to emit green light through glass plate 22, to produce "WALK" in green.

The above assembly forms no part of the present invention, however, and is described and illustrated herein solely for the purpose of providing an appropriate example of one application of the present invention.

Referring now to FIGS. 3 and 4, the details of the first embodiment of the device of the invention (also shown in FIGS. 1 and 2) are illustrated. The support for grids 32 takes the form of a thin double walled shell 41 preferably fabricated from a sheet of resilient thermoplastic dielectric material selected for high impact strength and good dimensional stability.

The support shell 41 is generally rectangular, being substantially the same shape as the interior of the housing, the dimension around the edge thereof providing for a snug fit therein. The support consists of a contoured cavity 42 bounded by an interior wall 44 having a double wall portion 44a and a relatively straight exterior wall 45. The double wall portion 44a is formed by folding the marginal material surrounding the cavity 42 back upon itself into a skirt-like structure with U-shaped channels 49 being formed therebetween.

The interior wall 44 of cavity 42 is contoured by forming it around the outline of the tubular light to be supported therein, or a pattern thereof, and firmly supports the tubular light preventing lateral movement in any direction between the light and support.

At each corner of the support shell 41 through the bottom of cavity 42, apertures 46 are cut, such apertures being slightly larger than the outside diameter of the tubing of grids 32 through which apertures the angled terminals 47 of the grids are extended into corresponding capped electrodes 30 of housing 28.

Additional support preventing relative movement of the tubular lights within support is provided in the form of elongated spacers 48 integrally formed in the bottom of shell 41 and projecting upwardly therefrom, such spacers being located to extend between straight tubular light elements of grids 32. The specific location and number of spacers is optional, the number shown herein, however, having been found quite adequate for the indicated application.

To retain the tubular light grids 32 firmly in place within support shell 41, a unique clip 50 is provided, preferably fabricated from a material such as a flat strip of spring steel. Clip 50 comprises a generally elongated flat body 51 of predetermined length with each end thereof formed into a U-shaped clamp 52, one clamp of the clip having its opening on one side of the flat body 51, the other clamp of such clip having its opening on the opposite side of body 51. The distal end or outer leg of each clamp is preferably formed with a double curve to increase the area of the opening. One end of clip body 51 is bifurcated and bent angularly outwardly over the opening of clamp forming an arm-like member 55 and curved at its distal end into a pressure foot 56.

To firmly retain the tubular light grids in their nested position within support 41, a pair of thin flat bars 60 of rigid clear plastic are utilized as shown in FIGS. 2, 3 and 4. The clamps 52 of one of the ends of clips 50 are mounted around the rear edge of exterior wall 45 of support 41 so that arms 55 of the clips are positioned directly over the ends of bars 60 with the respective pressure feet 56 in firm engagement therewith. Thus, the bars 60 under pressure of clips 50 maintain a constant firm pressure urging the tubular light grids 32 against the bottom of interior wall 44, effectively preventing any relative movement between the tubular light grids and the support.

Properly installed as shown in FIGS. 3 and 4, the U-shaped clamp 52 at the other end of each clip body 51 extends along the exterior wall 45 of support 41 and forwardly beyond the open face thereof. All that is necessary to mount the grids and the support in housing 28 is to slip the support 41 bottom first into the housing interior, slipping the forwardly extending clamps 52 of clips 50 around the forwardly disposed edges of housing 28 substantially as shown.

It has been found that the double wall of support 41, adapted to be fastened by the outside wall to the housing, effectively absorbs shock and vibration occurring in normal handling, installation, and during normal life of the entire signal assembly. Breakage and damage to the tubular lights, moreover, has virtually been eliminated with the support of this invention.

As already noted, tubular lights 68 forming complete words or messages are also used in pedestrian signals of the general character disclosed above. Referring now to FIGS. 5 and 6, a second embodiment of the device of the invention along these lines is illustrated. The support 74 for tubular lights forming words or messages is fabricated in basically the same manner as in the case of the tubular lights formed into grid patterns. A sample light or a pattern mold thereof is impressed into the center of a sheet of thermoplastic material, the marginal material being stretched around the curves and angles forming the outline of the top and bottom portions of the words somewhat as shown in FIG. 6, forming a contoured inside wall 75 of a cavity 76, the marginal material then being folded back upon itself into a flange that defines the outside wall 77, such outside wall being uncontoured, i.e., straight and flat. The edge of outside wall 77 is trimmed flush with the bottom of cavity 76, apertures 78 of the appropriate diameter being cut at each corner of cavity 76 to accommodate the terminals 80 of tubular lights that are extended therethrough.

From the obverse side, the inside wall 75 of cavity 76 is correspondingly contoured to fit around the upper and lower portions of the tubular light 68 as shown in FIG. 6. Although bars of transparent plastic can be used in conjunction with clips 50 as described and shown above in conjunction with the grid systems, small cleats 80, pivotally riveted at one end can be utilized to maintain the tubular lights firmly in place in the support cavity 76. Clips 83 are utilized to mount support 74 in housing 28, the ends of such clips being formed into clamps which grasp outside wall 77 of the support and the edge of housing 28, respectively.

With support 74 mounted within housing 28 by means of clips 83, shock and vibration will be absorbed by the exterior wall, and attenuated largely through the bend therein functioning in the same general manner as a hinge, very little of the shock and vibration being transmitted to the interior wall. It will be apparent to those skilled in the art that the degree of shock absorbance of the support walls will vary with the resilience of the plastic material from which the support is fabricated, a factor that should be considered in the selection of the material.

The device of the invention thus provides simple yet highly effective means for supporting tubular lighting members in a fashion which affords shock and vibration resistance so as to minimize breakage thereof.

While the device of the invention has been described and illustrated in detail, it is to be clearly understood that this is intended by way of illustration and example only and is not to be taken by way of limitation, the spirit and scope of this invention being limited only by the terms of the following claims.

I claim:
1. A tubular light package and support comprising:
a resilient dielectric shell provided with a tubular light nesting cavity surrounded by a substantially vertical wall,
means defining an attachment edge depending from said wall, said attachment edge being the edge of a wall formed by doubling said cavity wall back upon itself, said edge being adapted to be fastened to a lighting fixture housing,
a shock-absorbing space intermediate said attachment edge and said cavity wall,
means retaining said tubular light within said cavity, and
means mounting said package and support in a lighting fixture housing.

2. The tubular light package and support of claim 1 in which said cavity wall is contoured to assume the same shape as the outline of said tubular light.

3. The tubular light package and support of claim 1 in which said means retaining said tubular light in said cavity is a rigid transparent bar fastened transversely across said tubular light.

4. The tubular light package and support of claim 1 in which said means retaining said tubular light in said cavity is a cleat member pivotally fastened at one end thereof to said cavity wall, the free end thereof being positioned to extend across at least one element of said tubular light.

5. The tubular light package and support of claim 1 in which a plurality of cushion-like spacers are provided extending from the bottom of said cavity between adjacent elements of said tubular light.

6. A package and support for a tubular light comprising:
a resilient dielectric shell provided with a tubular light nesting cavity surrounded by a substantially vertical wall,
means defining an attachment edge depending from said wall, said attachment edge being the edge of a wall formed by doubling said cavity wall back upon itself, said wall extending in spaced relation to said cavity wall at a relatively small angle thereto, said edge being adapted to be fastened to a lighting fixture housing,
a shock-absorbing space being formed intermediate said attachment edge and said cavity wall,
means retaining said tubular light within said cavity, and
means mounting said package and support in a lighting fixture housing.

7. A package and support for a tubular light comprising:
a resilient dielectric shell provided with a tubular light nesting cavity surrounded by a substantially vertical wall,
means defining an attachment edge depending from said wall,
a shock-absorbing space being formed intermediate said attachment edge and said cavity wall,
means retaining said tubular light within said cavity, and
means mounting said package and support in a lighting fixture housing comprising a plurality of clip members, each of said clip members including an elongated flat body and a U-shaped clamp at each end of said body, one of said clamps gripping said attachment edge, the other of said clamps gripping the edge of said lighting fixture housing.

8. A tubular light package and support comprising:
a resilient dielectric shell provided with a tubular light nesting cavity surrounded by a substantially vertical wall,
means defining an attachment edge depending from said wall,
a shock-absorbing space intermediate said attachment edge and said cavity wall,
means retaining said tubular light within said cavity comprising a rigid transparent bar fastened transversely across said tubular light, and
means mounting said package and support in a lighting fixture housing comprising a plurality of clip members each of said clip members including an elongated flat body and a U-shaped clamp at each end of said body, one of said clamps gripping said attachment edge, the other of said clamps gripping the edge of said lighting fixture housing, each of said clip members further including arm means extending angularly from said flat body for applying pressure against an end of said transparent bar to hold said bar against said tubular light.

9. The tubular light package and support of claim 8 and including at least two of said transparent bars positioned near opposite ends of said tubular light, each of said bars being held in place by a pair of oppositely positioned clip members.

References Cited

UNITED STATES PATENTS

| 1,654,350 | 12/1927 | Shelton | 240—11.4 |
| 1,817,397 | 8/1931 | Sarafian | 240—11.4 |
| 2,114,550 | 4/1938 | Vandermeer | 240—11.4 |
| 2,216,993 | 10/1940 | Von Wedel | 240—11.4 |
| 2,530,360 | 11/1950 | Price | 240—41.5 |
| 2,785,291 | 3/1957 | Bernstein | 240—3.1 |
| 2,894,693 | 7/1959 | Howarth | 240—3 |
| 3,018,365 | 1/1962 | Wenman et al. | 240—90 |
| 3,101,177 | 8/1963 | Loomis et al. | 240—90 |
| 3,136,489 | 6/1964 | Oharenko | 240—11.4 |

NORTON ANSHER, *Primary Examiner.*

JOHN M. HORAN, *Examiner.*

W. M. FRYE, R. M. SHEER, *Assistant Examiners.*